(12) United States Patent
Chen

(10) Patent No.: US 8,640,999 B2
(45) Date of Patent: Feb. 4, 2014

(54) FASTENING DEVICE FOR BICYCLE SEAT PAD AND SEAT TUBE USING THE SAME

(75) Inventor: Chih-Ming Chen, Taichung County (TW)

(73) Assignee: Yeu Chueh Industry Co., Ltd., Taichung County (TW)

( * ) Notice: Subject to any disclaimer, the term of this patent is extended or adjusted under 35 U.S.C. 154(b) by 0 days.

(21) Appl. No.: 13/350,019

(22) Filed: Jan. 13, 2012

(65) Prior Publication Data

US 2012/0112027 A1     May 10, 2012

Related U.S. Application Data

(63) Continuation-in-part of application No. 12/780,859, filed on May 14, 2010, now abandoned.

(30) Foreign Application Priority Data

Apr. 20, 2010    (TW) ................................ 99207148 U

(51) Int. Cl.
    *F16M 13/00*      (2006.01)
(52) U.S. Cl.
    USPC ...................... 248/158; 248/316.1; 248/309.1; 248/540; 297/215.14
(58) Field of Classification Search
    USPC ............. 297/215.14, 195.1, 215.13; 248/158, 248/177.1, 176.1, 316.1, 316.8, 231.41, 248/121, 122.1, 126, 274.1, 276.1, 278.1, 248/309.1, 519.534, 540, 215, 227.4, 248/231.51; 285/197
    See application file for complete search history.

(56) References Cited

U.S. PATENT DOCUMENTS

| 4,142,813 | A | * | 3/1979 | Laborde | ......................... 403/391 |
| 5,190,346 | A | * | 3/1993 | Ringle | ..................... 297/215.14 |
| 5,203,484 | A | | 4/1993 | Englander | |
| 5,333,826 | A | * | 8/1994 | Lai | ............................ 248/229.14 |
| 5,466,042 | A | * | 11/1995 | Herman | .................... 297/215.15 |
| 5,501,506 | A | | 3/1996 | Kao | |
| 5,722,718 | A | | 3/1998 | Still et al. | |
| 5,979,978 | A | | 11/1999 | Olsen et al. | |
| 5,988,741 | A | | 11/1999 | Voss et al. | |
| 6,561,578 | B1 | * | 5/2003 | Mel | ............................. 297/195.1 |
| 7,431,391 | B2 | * | 10/2008 | Hsiao | ........................ 297/215.15 |
| 7,559,603 | B1 | | 7/2009 | Chiang | |
| 7,614,592 | B2 | | 11/2009 | Bean et al. | |
| 7,681,947 | B2 | | 3/2010 | Ritchey | |
| 8,267,470 | B2 | * | 9/2012 | Hsu et al. | ................. 297/215.14 |

(Continued)

FOREIGN PATENT DOCUMENTS

TW    M289401    4/2006

*Primary Examiner* — Terrell McKinnon
*Assistant Examiner* — Monica Millner
(74) *Attorney, Agent, or Firm* — Muncy, Geissler, Olds & Lowe, PLLC

(57) ABSTRACT

The fastening device of the present invention includes a base, two pawl shanks and two positioning rods. The base is formed with two hook portions and two base positioning holes. Each pawl shank is formed with a pawl positioning hole, and each pawl shank includes a pawl section and a hook section. Each positioning rod inserts in one of the base positioning holes and the pawl positioning hole of one of the pawl shanks, such that the pawl shanks are pivotable about the positioning rods respectively. Each hook portion and its corresponding hook section define a tube clamp space, and the pawl sections define a pad clamp space. The fastening device further includes a means for narrowing the tube clamp spaces and the pad clamp space.

8 Claims, 4 Drawing Sheets

(56) References Cited

U.S. PATENT DOCUMENTS

| | | |
|---|---|---|
| 2005/0035249 A1 | 2/2005 | Busuito |
| 2005/0225132 A1* | 10/2005 | Tisue .................... 297/195.1 |
| 2006/0152045 A1* | 7/2006 | Okajima et al. ........... 297/195.1 |
| 2007/0138846 A1* | 6/2007 | Ritchey .................... 297/215.14 |

* cited by examiner ent invention;

FASTENING DEVICE FOR BICYCLE SEAT PAD AND SEAT TUBE USING THE SAME

The present invention is a CIP of application Ser. No. 12/780,859, filed May 14, 2010, the entire contents of which are hereby incorporated by reference.

BACKGROUND OF THE INVENTION

1. Field of the Invention
2. Description of the Prior Art

A seat tube of the bicycle is adapted for a seat pad to be disposed thereon. To install the seat pad, a fastening device is needed as disclosed in TW M289401. The fastening device mainly includes a middle shank and two side shanks, and two engaging spaces are defined between the middle shank and the side shanks respectively. Thus when the side shanks are urged toward each other, the bottom tubes of the seat pad can be tightly clamped in the engaging spaces respectively.

However, there is still one disadvantage that it is not convenient for a user to hold the middle shank and the side shanks simultaneously with one hand while threading a screw through these shanks with the other hand. Individual components are too many to be held stably.

Another fastening device is provided in U.S. Pat. No. 5,988,741. Components of the fastening device are pre-constructed by screws. Thus, unexpected dropping of the components is prevented.

However, employment of the device provided in U.S. Pat. No. 5,988,741 is still redundant. User has to hold and tighten multiple screws to accomplish attachment and fixation of the seat pad.

The present invention is, therefore, arisen to obviate or at least mitigate the above mentioned disadvantages.

SUMMARY OF THE INVENTION

The main object of the present invention is to provide an easy-installed fastening device for a bicycle seat pad.

To achieve the above and other objects, the fastening device of the present invention includes a base and two pawl shanks. The base is formed with two hook portions. Each pawl shank comprises a pawl section and a hook section. The pawl shanks are pivoted to the base. The pawl shanks are pivotable about two pivoting axes respectively. Each hook portion and its corresponding hook section define a tube clamp space, and the pawl sections define a pad clamp space. The tube clamp spaces and the pad clamp space are narrowed or enlarged when the pawl shanks pivot about the pivoting axes respectively. The pivoting axes are perpendicular to width directions defined by the tube clamp spaces along which the pad clamps are narrowed or enlarged. The fastening device further includes a means for narrowing the tube clamp spaces and the pad clamp space.

Due to the pivoting, the pawl shanks of the present invention are pivotable and can be easily held by the user. Clamping can be accomplished by single narrowing means. The installation of the seat pad is, therefore, facilitated.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1A:
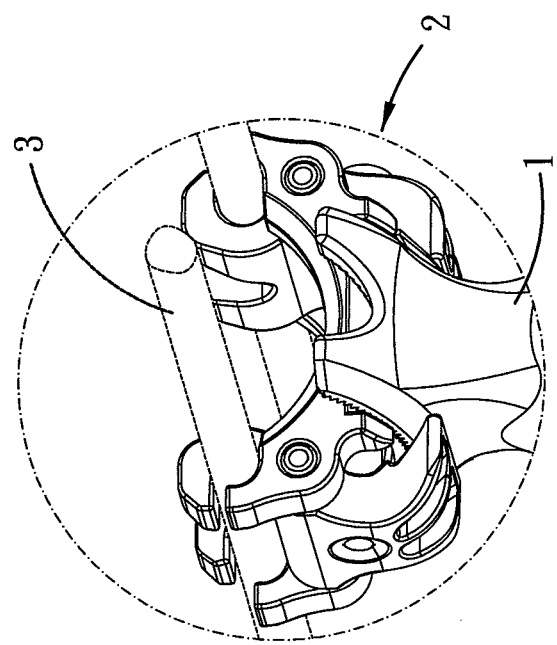
FIG. 1A is a partial enlargement drawing of FIG. 1.
Figure 1:
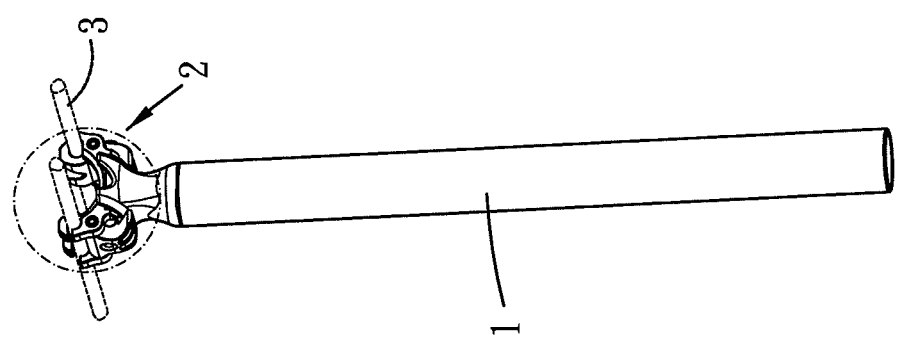
FIG. 1 is a perspective drawing showing a seat tube of the present invention.

Please refer to FIG. 1 and FIG. 1A. A seat tube of the present invention includes a tube member 1 and a fastening device 2 for a bicycle seat pad. Please refer to FIG. 2. The tube member 1 has an upper end, on which a connecting head 11 is formed. The connecting head 11 is adapted for the fastening device 2 to be installed thereon, and an upper surface thereof can be a protrusive arc surface. Or, the upper surface of the connecting head 11 can be a concave arc surface, as shown in FIG. 3. The upper surface can be formed with grooves to increase friction.

Figure 2:
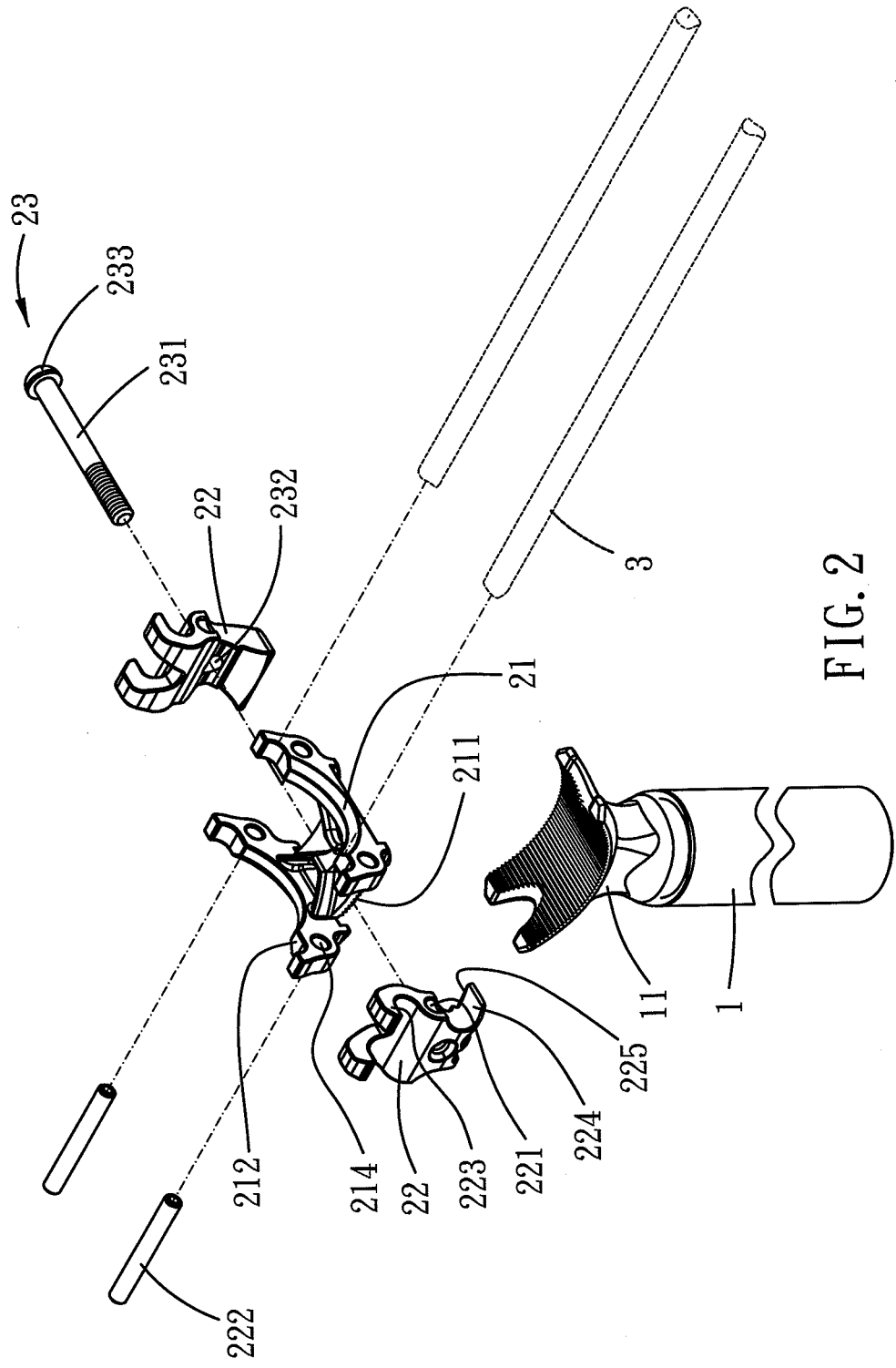
FIG. 2 is a breakdown drawing showing a seat tube of the present invention.
Figure 3:
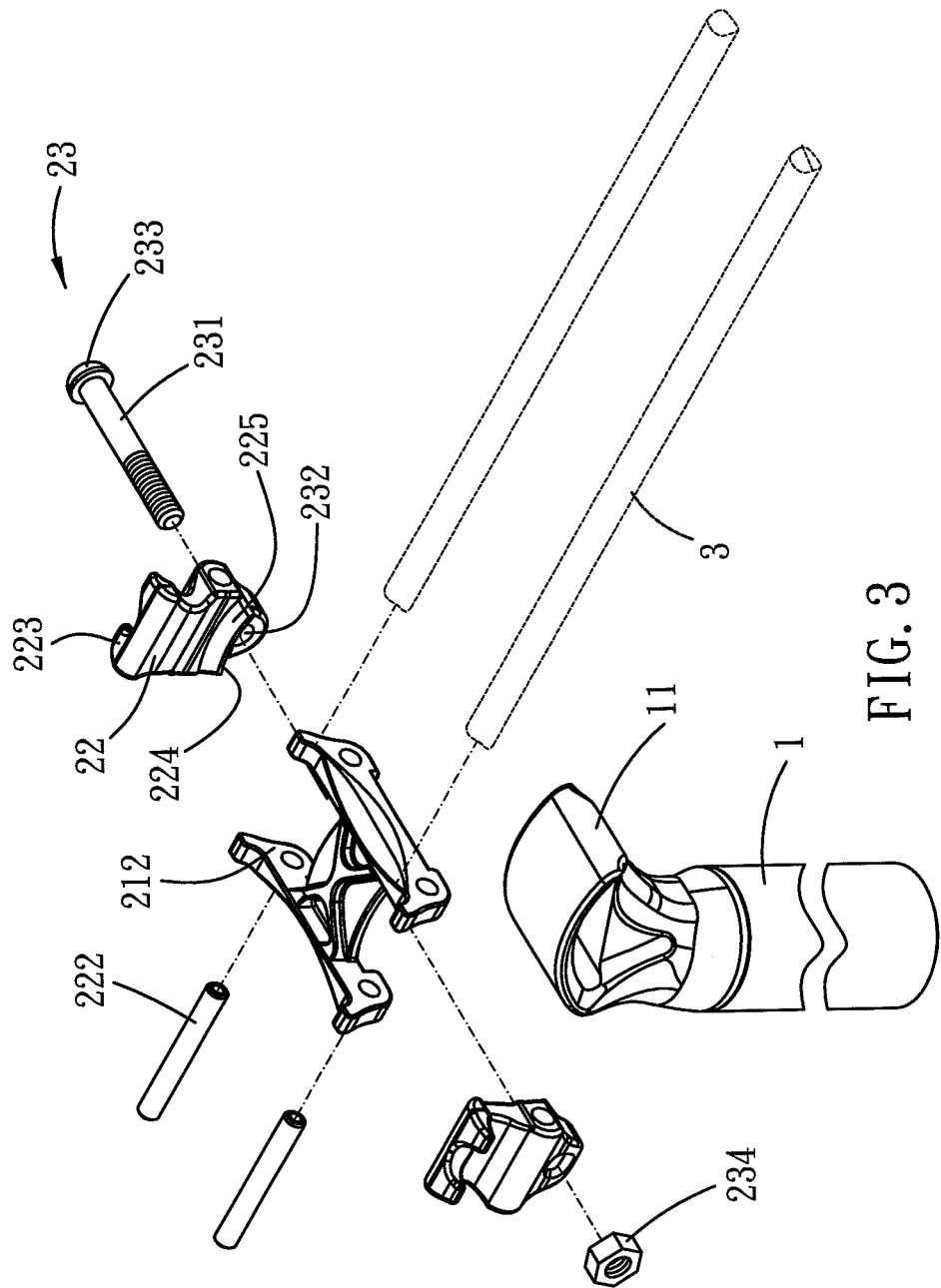
FIG. 3 is a breakdown drawing showing another seat tube of the present invention.

Please refer to FIG. 2. The fastening device 2 includes a base 21, two pawl shanks 22 and a narrowing means 23.

The base 21 has an upper surface and a bottom surface 211. The bottom surface 211 tightly abuts against the upper surface of the connecting head 11, and the bottom surface 211 may also correspondingly formed with grooves. The base 21 is formed with two hook portions near a top thereof, each of which includes two arms 212. More specifically, the hook portions are disposed on both sides of the base 21 respectively. Among each hook portion, one of the arms is disposed at the front portion of the base 21, and the other arm is disposed at the rear portion of the base. In other possible embodiments of the present invention, each hook portion may include only one arm or more than two arms.

The pawl shanks 22 are pivotably disposed on two ends of the base 21. The pawl shanks 22 are pivotable with respect to the base 21. More specifically, the base 21 is formed with two base positioning holes 214, each of which penetrates the arms 212 of each hook portion, and each pawl shank 22 is formed with a pawl positioning hole 221. Each pawl shank 22 is disposed between the arms 212 of a hook portion, thus the base positioning holes 214 communicate with the pawl positioning holes 221 respectively. Two positioning rods 222 are provided to insert the base positioning holes 214 and their corresponding pawl positioning holes 221 respectively. As such, the pawl shanks 22 are pivoted to the base 21, and are pivotable about pivoting axes defined by the positioning rods 222 respectively. To elaborate, the pivoting axes are parallel to longitudinal directions of the positioning rods 222. In other possible embodiments of the present invention, the positioning rods may be replaced by positioning nodes formed on the base or the pawl shanks so as to pivot the pawl shanks to the base. Each pawl shanks includes an upper hook section 223 and a lower pawl section 224. The two hook sections 223 are located between the two hook portions. The pawl positioning hole 221 is located between the upper hook section 223 and the lower pawl section 224. Each hook section 223 and the arms 212 of its corresponding hook portion define a tube clamp space, and the two pawl sections define a pad clamp space. A width of the pad clamp space is defined as a distance between the two pawl sections 224, and a direction of the width of the pad clamp space is perpendicular to both the two pivoting axes. The tube clamp spaces are enlarged or narrowed along width directions thereof. Longitudinal directions of the positioning rods are parallel to each other, and are perpendicular to the width directions of the tube clamp spaces. Please refer to FIG. 4. Each pawl section has an abutting surface 225 to abut against the connecting head 11, while the abutting surface 225 is slanted.

Figure 4:
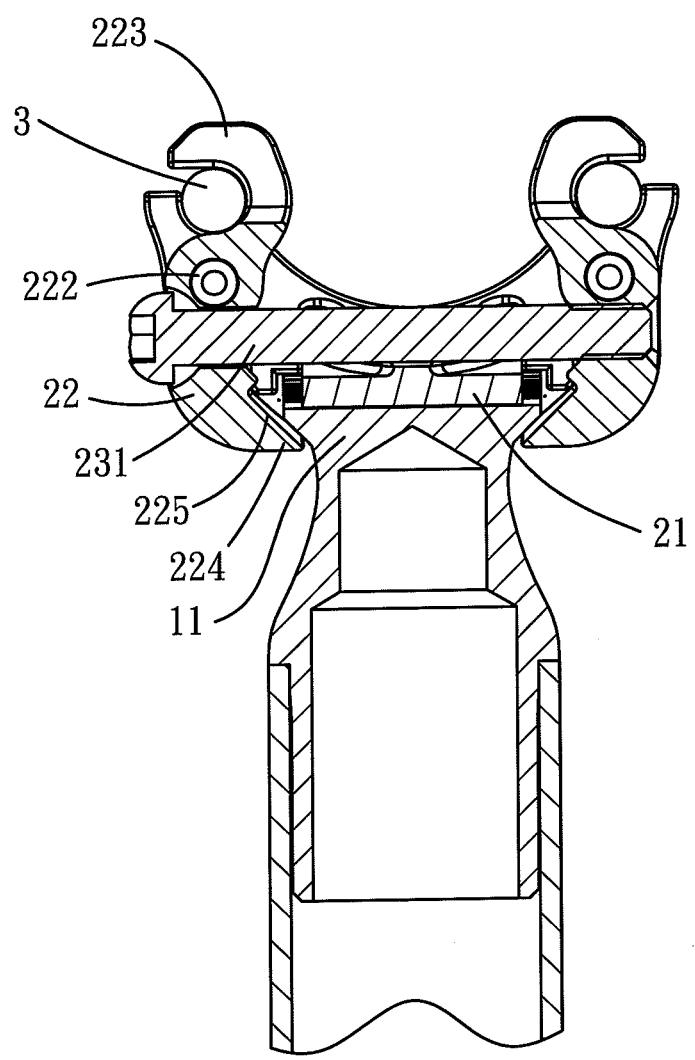
FIG. 4 is a profile showing a seat tube of the present invention.

The narrowing means 23 is adapted for narrowing the pad clamps and the pad clamp space. More specifically, the narrowing means 23 may include a screw 231, a through hole 232 and a threaded bore. The screw 231 has a head 233 and a threaded rod axially extended from the head 233. The through hole 232 is formed on one of the pawl shanks, and the threaded bore is formed on the other pawl shank. The threaded rod is inserted through the through hole 232 and then threaded with the threaded bore. Thus as the screw 231 rotates, the pawl shanks are driven to slightly pivot about the positioning rods 222 respectively, narrowing or enlarging the tube clamp spaces and the pad clamp space. Please refer to FIG. 3. In another embodiment of the present invention, the fastening means includes a screw 231, two through holes 232 and a nut 234. The through holes 232 are formed on the pawl shanks 22 respectively, and the threaded rod is inserted through the through holes 232 and then threaded with the nut. As such, the pawl shanks 22 can also be urged to pivot, narrowing or enlarging the tube clamp spaces and the pad clamp space. More specifically, when the pawl shanks are pivoted in two specific directions which are opposite to each other, the hook sections move toward their corresponding hook portions so as to narrow the tube clamp spaces, and the pawl sections move toward each other so as to reduce the width of the pad clamp space. Therefore, the tube clamp spaces are adapted to clamp two bottom tubes 3 of a bicycle seat tube, as shown in FIG. 4, and the pad clamp space is adapted to clamp the connecting head 11. By the structure mentioned above, the positioning rods 222 are parallel to the bottom tubes 3 since that the tube clamp spaces clamp the bottom tubes laterally or perpendicularly, and that the positioning rods 222 are perpendicular to the width directions defined by the tube clamp spaces.

It is noted that when the fastening device is under assemblage, the pawl shanks is rotatably and can be easily held by the user due to the positioning rods. In addition, attaching and clamping seat pad to the fastening device can be accomplished by the narrowing means easily. As such, the installation of the fastening device and the bicycle seat pad can be facilitated.

What is claimed is:

1. A fastening device for a bicycle seat pad, comprising:
   a base, being formed with two hook portions near a top of the base;
   two pawl shanks, each pawl shank comprising a lower pawl section and an upper hook section, the pawl shanks being pivotably disposed on two ends of the base respectively, the pawl shanks being pivotable about two pivoting axes respectively wherein the two pivoting axes are parallel to each other, and each pivoting axis is located between the pawl section and the hook section of one of the pawl shanks;
   wherein the two hook sections are located between two hook portions, each hook portion and its corresponding hook section define a tube clamp space therebetween for clamping a bottom tube of the bicycle seat pad, the two pawl sections define a pad clamp space therebetween for clamping the bicycle seat pad, a width of the pad clamp space is defined as a distance between the two pawl sections, a direction of the width of the pad clamp space is perpendicular to both the two pivoting axes;
   wherein when the pawl shanks are pivoted in two specific directions which are opposite to each other, the hook sections move toward their corresponding hook portions so as to narrow the tube clamp spaces, and the pawl sections move toward each other so as to reduce the width of the pad clamp space;
   a means for narrowing the tube clamp spaces and the pad clamp space.

2. The fastening device of claim 1, wherein the fastening device further comprises two position rods, the base is formed with two base positioning holes, each pawl shank is formed with a pawl positioning hole, each positioning rod inserts in one of the base positioning holes and the pawl positioning hole of one of the pawl shanks, such that the pawl shanks are pivotable about the pivoting axes defined by the positioning rods respectively.

3. The fastening device of claim 1, wherein the pivoting axes are parallel to the bottom tubes when the bottom tubes are clamped.

4. The fastening device of claim 1, wherein the means for narrowing comprises a screw, a through hole and a threaded bore, the screw has a head and a threaded rod axially extended from the head, the through hole is formed on one of the pawl shanks, the threaded bore is formed on the other pawl shank, the threaded rod is inserted through the through hole and threaded with the threaded bore.

5. The fastening device of claim 1, wherein the means for narrowing comprises a screw, two through holes and a nut, the screw has a head and a threaded rod axially extended from the head, the through holes are formed on the pawl shanks respectively, the threaded rod is inserted through the through holes and then threaded with the nut.

6. The fastening device of claim 1, wherein each pawl section has an abutting surface, the abutting surface is slanted.

7. The fastening device of claim 1, wherein each hook portion comprises two arms, each base positioning hole is defined on the arms of each hook portion, each pawl shank is disposed between the arms of each hook portion, each tube clamp space is defined by the hook section and the arms of each hook portion.

8. A seat tube having the fastening device of claim 1, further comprising a tube member, the tube member having an upper end, a connecting head is formed on the upper end, the connecting head is clamped by the pad clamp space.

* * * * *